(12) United States Patent
Thibaud (10) Patent No.: US 10,507,936 B2
(45) Date of Patent: Dec. 17, 2019

(54) CATALYTIC FUEL TANK INERTING SYSTEM

(71) Applicant: HAMILTON SUNDSTRAND CORPORATION, Charlotte, NC (US)

(72) Inventor: Catherine Thibaud, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 137 days.

(21) Appl. No.: 15/849,151

(22) Filed: Dec. 20, 2017

(65) Prior Publication Data

US 2019/0185174 A1 Jun. 20, 2019

(51) Int. Cl.
| | |
|---|---|
| *B64D 37/32* | (2006.01) |
| *B64D 37/04* | (2006.01) |
| *B64D 37/06* | (2006.01) |
| *B01J 19/24* | (2006.01) |
| *B01D 53/86* | (2006.01) |

(52) U.S. Cl.
CPC ......... *B64D 37/32* (2013.01); *B01D 53/8671* (2013.01); *B01J 19/24* (2013.01); *B64D 37/04* (2013.01); *B64D 37/06* (2013.01); *B01D 2257/104* (2013.01); *B01J 2219/00164* (2013.01); *B01J 2219/24* (2013.01)

(58) Field of Classification Search
None
See application file for complete search history.

(56) References Cited

U.S. PATENT DOCUMENTS

| | | | |
|---|---|---|---|
| 3,847,298 A | * | 11/1974 | Hamilton ................ B01J 19/14 220/88.3 |
| 7,694,916 B2 | | 4/2010 | Limaye et al. |
| 7,837,764 B2 | | 11/2010 | Sanford |
| 7,896,292 B2 | | 3/2011 | Limaye et al. |
| 7,905,259 B2 | | 3/2011 | Johnson et al. |

(Continued)

FOREIGN PATENT DOCUMENTS

| | | |
|---|---|---|
| EP | 2439141 A2 | 4/2012 |
| EP | 3023518 A1 | 5/2016 |

(Continued)

OTHER PUBLICATIONS

European Search Report dated Mar. 28, 2019 cited in Application No. 18214791.8, 7 pgs.

*Primary Examiner* — Jelitza M Perez
(74) *Attorney, Agent, or Firm* — Cantor Colburn LLP (57) ABSTRACT

A fuel tank inerting system is disclosed. The system includes a fuel tank and a catalytic reactor. The catalytic reactor is arranged to receive a first reactant from a first reactant source and to receive a second reactant from a second reactant source, and to react the first and second reactants to generate an inert gas. The system also includes an inert gas flow path from the catalytic reactor to the fuel tank. The catalytic reactor includes first, second, and third flow paths. The first flow path includes receives a first reactant and includes a reactive flow path including a catalyst. The second flow path receives a second reactant source and is in operative fluid communication with the first flow path through a first barrier between the first and second flow paths that is permeable to the second reactant. The third flow path receives a fluid coolant.

20 Claims, 3 Drawing Sheets

(56) References Cited

U.S. PATENT DOCUMENTS

| | | |
|---|---|---|
| 8,828,344 B2 | 9/2014 | K-Wlam et al. |
| 9,144,768 B2 | 9/2015 | Tichborne et al. |
| 9,687,773 B2 | 6/2017 | Johnson et al. |
| 2008/0128048 A1 | 6/2008 | Johnson et al. |
| 2016/0206995 A1 | 7/2016 | Rugg et al. |

FOREIGN PATENT DOCUMENTS

| | | | |
|---|---|---|---|
| FR | 2248710 | A5 | 5/1975 |
| WO | 2007008730 | A2 | 1/2007 |

\* cited by examiner

CATALYTIC FUEL TANK INERTING SYSTEM

BACKGROUND

The subject matter disclosed herein generally relates to fuel handling systems, and more particularly to fuel tank inerting systems such as used on aircraft.

It is recognized that fuel vapors within fuel tanks become combustible in the presence of oxygen. An inerting system decreases the probability of combustion of flammable materials stored in a fuel tank by maintaining a chemically non-reactive or inert gas, such as nitrogen-enriched air, in the fuel tank vapor space, also known as ullage. Three elements are required to initiate and sustain combustion: an ignition source (e.g., heat), fuel, and oxygen. Combustion may be prevented by reducing any one of these three elements. If the presence of an ignition source cannot be prevented within a fuel tank, then the tank may be made inert by: 1) reducing the oxygen concentration, 2) reducing the fuel concentration of the ullage to below the lower explosive limit (LEL), or 3) increasing the fuel concentration to above the upper explosive limit (UEL). Many systems reduce the risk of combustion by reducing the oxygen concentration by introducing an inert gas such as nitrogen-enriched air (NEA) to the ullage, thereby displacing oxygen with a mixture of nitrogen and oxygen at target thresholds for avoiding explosion or combustion.

It is known in the art to equip aircraft with onboard inert gas generating systems, which supply nitrogen-enriched air to the vapor space (i.e., ullage) within the fuel tank. The nitrogen-enriched air has a substantially reduced oxygen content that reduces or eliminates combustible conditions within the fuel tank. Onboard inert gas generating systems typically use membrane-based gas separators. Such separators contain a membrane that is permeable to oxygen and water molecules, but relatively impermeable to nitrogen molecules. A pressure differential across the membrane causes oxygen molecules from air on one side of the membrane to pass through the membrane, which forms oxygen-enriched air (OEA) on the low-pressure side of the membrane and NEA on the high-pressure side of the membrane. The requirement for a pressure differential necessitates a source of compressed or pressurized air. Bleed air from an aircraft engine or from an onboard auxiliary power unit can provide a source of compressed air; however, this can reduce available engine power and also must compete with other onboard demands for compressed air, such as the onboard air environmental conditioning system and anti-ice systems. Moreover, certain flight conditions such as during aircraft descent can lead to an increased demand for NEA at precisely the time when engines could be throttled back for fuel savings so that maintaining sufficient compressed air pressure for meeting the pneumatic demands may come at a significant fuel burn cost. Additionally, there is a trend to reduce or eliminate bleed-air systems in aircraft; for example Boeing's 787 has a no-Need systems architecture, which utilizes electrical systems to replace most of the pneumatic systems to improve fuel efficiency, as well as reduce weight and lifecycle costs. Other aircraft architectures may adopt low-pressure bleed configurations where engine design parameters allow for a bleed flow of compressed air, but at pressures less than the 45 psi air (unless stated otherwise, "psi" as used herein means absolute pressure in pounds per square inch, i.e., psia) that has been typically provided in the past to conventional onboard environmental control systems. A separate compressor or compressors can be used to provide pressurized air to the membrane gas separator, but this undesirably increases aircraft payload, and also represents another onboard device with moving parts that is subject to maintenance issues or device failure.

BRIEF DESCRIPTION

A fuel tank inerting system is disclosed. The system includes a fuel tank and a catalytic reactor. The catalytic reactor is arranged to receive a first reactant from a first reactant source and to receive a second reactant from a second reactant source, and to react the first and second reactants to generate an inert gas. The system also includes an inert gas flow path from the catalytic reactor to the fuel tank. The catalytic reactor includes first, second, and third flow paths. The first flow path comprises a first inlet in operative fluid communication the first reactant source, a first outlet in operative fluid communication with the inert gas flow path, and a reactive flow path including a catalyst between the first inlet and the first outlet. The second flow path comprises a second inlet in operative fluid communication with the second reactant source and is in operative fluid communication with the first flow path through a first barrier between the first and second flow paths that is permeable to the second reactant. The third flow path comprises a third inlet in operative fluid communication with a fluid coolant, and a third outlet, said third flow path in operative thermal communication with the first flow path.

In some embodiments, the first reactant comprises air, and the second reactant comprises fuel.

In some embodiments, the system comprises liquid fuel on the second flow path.

In some embodiments, the system comprises vaporized fuel on the second flow path.

In any one or combination of the foregoing embodiments, the first reactant comprises vaporized fuel, and the second reactant comprises oxygen.

In any one or combination of the foregoing embodiments, the second flow path is devoid of outlets except through the first barrier.

In any one or combination of the foregoing embodiments, the catalytic reactor comprises a plurality of said first flow paths, or a plurality of said second flow paths, or a plurality of said third flow paths, or any combination thereof.

In any one or combination of the foregoing embodiments, the system further comprises a heat source or a heat sink in operative thermal communication with either or both of the first reactant or the second reactant delivered to the catalytic reactor inlet.

In any one or combination of the foregoing embodiments, the first, second, and third flow paths are arranged in the catalytic reactor in a planar configuration.

In any one or combination of the foregoing embodiments, at least one of the first flow path, the second flow path, or the third flow path comprises an internal space of a tubular conduit disposed in the catalytic reactor.

In some embodiments comprising a tubular conduit, another of the first flow path, the second flow path, or the third flow path comprises a space in the catalytic the catalytic reactor external to the tubular conduit.

In any one or combination of the foregoing embodiments comprising a tubular conduit, the third flow path comprises the internal space of the tubular conduit.

In any one or combination of the foregoing embodiments comprising a tubular conduit, the first flow path comprises the catalyst disposed in a fluid-permeable arrangement on an exterior surface of the tubular conduit.

In any one or combination of the foregoing embodiments comprising a tubular conduit, the third flow path comprises the internal space of the tubular conduit, the first flow path comprises the catalyst disposed in a fluid-permeable arrangement on an exterior surface of the tubular conduit, and the second flow path comprises a space in the catalytic external to the tubular conduit.

In any one or combination of the foregoing embodiments, the system further comprises a second barrier between the second flow path and the third flow path, said second barrier being thermally conductive and impermeable to fluids.

In any one or combination of the foregoing embodiments, the system further comprises a controller configured to control at least one of a flow rate of the first reactant, a flow rate of the second reactant, or a flow rate of the fluid coolant.

In some embodiments, the controller is configured to control at least one of the first reactant flow rate, the second reactant flow rate, or the fluid coolant flow rate to maintain a temperature in the catalytic reactor or at an outlet of the catalytic reactor.

In some embodiments the controller is configured to maintain the temperature at less than 300° C.

Also disclosed is a method of operating the fuel tank inerting system of any one or combination of the foregoing embodiments, comprising delivering the first and second reactants to the first and second inlets and delivering the fluid coolant to the third inlet, reacting the first and second reactants along the reactive flow path to produce inert gas, and delivering the inert gas through the inert gas flow path to the fuel tank.

In some embodiments, the method further comprising controlling at least one of a flow rate of the first reactant, a flow rate of the second reactant, or a flow rate of the fluid coolant to maintain a temperature in the catalytic reactor or at an outlet of the catalytic reactor

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1A:
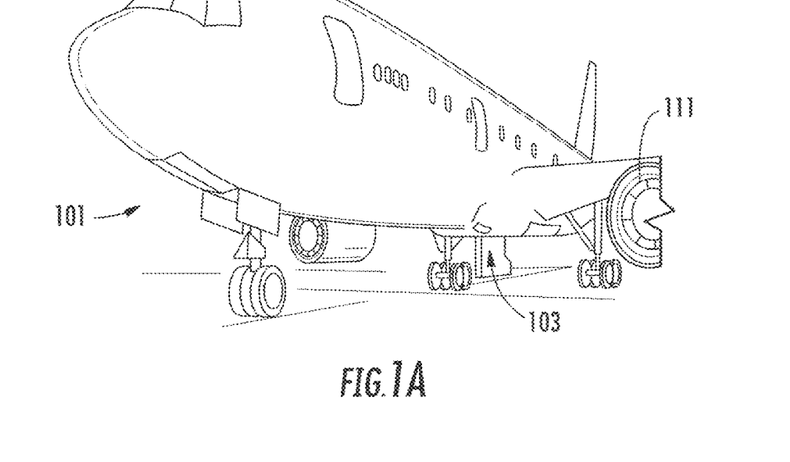
FIG. 1A is a schematic illustration of an aircraft that can incorporate various embodiments of the present disclosure.
Figure 1B:
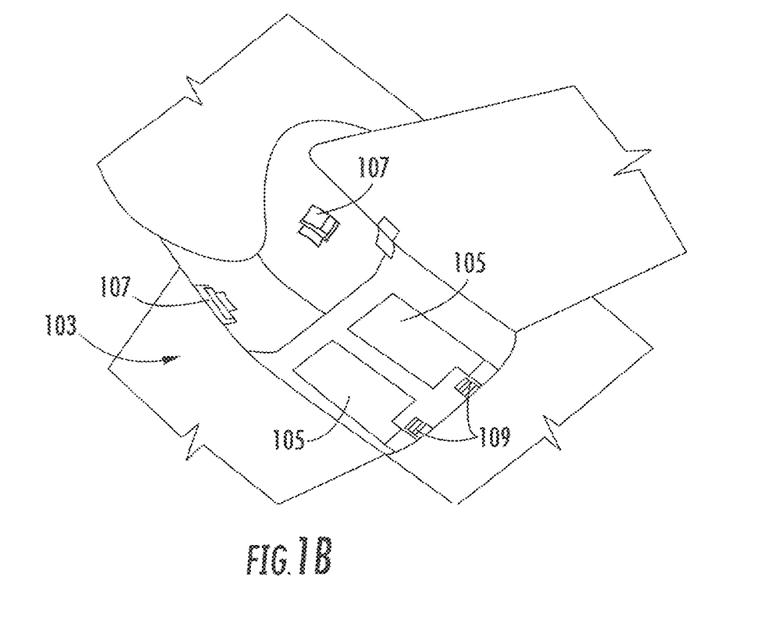
FIG. 1B is a schematic illustration of a bay section of the aircraft of FIG. 1A.

As shown in FIGS. 1A-1B, an aircraft 101 can include one or more bays 103 beneath a center wing box. The bay 103 can contain and/or support one or more components of the aircraft 101. For example, in some configurations, the aircraft 101 can include environmental control systems and/or fuel inerting systems within the bay 103. As shown in FIG. 1B, the bay 103 includes bay doors 105 that enable installation and access to one or more components (e.g., environmental control systems, fuel inerting systems, etc.). During operation of environmental control systems and/or fuel inerting systems of the aircraft 101, air that is external to the aircraft 101 can flow into one or more ram air inlets 107. The outside air may then be directed to various system components (e.g., environmental conditioning system (ECS) heat exchangers) within the aircraft 101. Some air may be exhausted through one or more ram air exhaust outlets 109.

Also shown in FIG. 1A, the aircraft 101 includes one or more engines 111. The engines 111 are typically mounted on wings of the aircraft 101, but may be located at other locations depending on the specific aircraft configuration. In some aircraft configurations, air can be bled from the engines 111 and supplied to environmental control systems and/or fuel inerting systems, as will be appreciated by those of skill in the art.

As noted above, typical air separation modules operate using pressure differentials to achieve desired air separation. Such systems require a high pressure pneumatic source to drive the separation process across the membrane. Further, the hollow fiber membrane separators commonly used are relatively large in size and weight, which is a significant consideration with respect to aircraft (e.g., reductions in volume and weight of components can improve flight efficiencies). Embodiments provided herein can provide reduced volume and/or weight characteristics of air separation modules for aircraft. In accordance with some embodiments of the present disclosure, the typical hollow fiber membrane separator can be replaced by a catalytic system (e.g., $CO_2$ generation system), which can be, for example, smaller, lighter, more durable, and/or more efficient than the typical fiber membrane separators. The catalytic system can be used on any fuel tank system, whether stationary (e.g., a tank farm) or on a vehicle with on-board fuel (i.e., fueled vehicle) such as an aircraft, ship, submarine or other marine vehicle, or land vehicle.

A function of fuel tank flammability reduction systems in accordance with embodiments of the present disclosure is accomplished by reacting a small amount of a first reactant (e.g., fuel vapor) with a second reactant (e.g., oxygen from an oxygen source such as an air source). For the sake of convenience, the discussion below refers to fuel as the first reactant and oxygen or air as the second reactant; however, the terms "first" and "second" are of course arbitrary, and the first reactant can be oxygen or air and the second reactant can be fuel. In any case, the product of the reaction is carbon dioxide and water vapor. The source of the second reactant (e.g., air) can be bleed air or any other source of air containing oxygen, including, but not limited to, high-pressure sources (e.g., engine), bleed air, cabin air, etc. A catalyst material such as a noble metal catalyst is used to catalyze the chemical reaction. The carbon dioxide that results from the reaction is an inert gas that is mixed with nitrogen naturally found in fresh/ambient air, and is directed back within a fuel tank to create an inert environment within the fuel tank, thus reducing a flammability of the vapors in the fuel tank.

As mentioned above, a catalyst is used to catalyze a chemical reaction between oxygen ($O_2$) and fuel to produce carbon dioxide ($CO_2$) and water. The source of $O_2$ used in the reaction can come from any of a number of air sources, including, but not limited to, pneumatic sources on an aircraft that supply air at a pressure greater than ambient. Fuel for the reaction can be provided from the vapor space of the fuel tank or by vaporizing liquid fuel from the aircraft fuel tank. The fuel can be heated to promote vaporization of the fuel, such as by using an electric heater, as shown and described in some embodiments of the present disclosure. Any inert gas species that are present with the reactants (for example, nitrogen) will not react and will thus pass through the catalyst unchanged.

In some embodiments, the catalyst can be in a form factor that acts as a heat exchanger. For example, in one non-limiting configuration, a plate fin heat exchanger configuration is employed wherein a hot side of the heat exchanger would be coated with catalyst material. In such arrangement, the cold side of the catalyst heat exchanger can be fed with a cool air source, such as ram air or some other source of cold air. The air through the cold side of the heat exchanger can be controlled such that the temperature of a hot, mixed-gas stream is hot enough to sustain a desired chemical reaction within or at the catalyst. Further, the cooling air can be used to maintain a cool enough temperature to enable removal of heat generated by exothermic reactions at the catalyst.

The catalytic chemical reaction between fuel and air also generates water. Water in the fuel tank can be undesirable. Thus, in accordance with embodiments of the present disclosure, the water from a product gas stream (e.g., exiting the catalyst) can be removed through various mechanisms, including, but not limited to, condensation. The product gas stream can be directed to enter a heat exchanger downstream from the catalyst that is used to cool the product gas stream such that the water vapor condenses out of the product gas stream. The liquid water can then be drained overboard. In some embodiments, an optional water separator can be used to augment or provide water separation from the product stream.

Aircraft fuel tanks are typically vented to ambient pressure. At altitude, pressure inside the fuel tank is very low and is roughly equal to ambient pressure. However, during descent, the pressure inside the fuel tank needs to rise to equal ambient pressure at sea level (or at whatever altitude the aircraft is landing). This change in pressure requires gas entering the tank from outside to equalize with the pressure in the tank. When air from outside enters the tank, water vapor is normally present with it. Water can become trapped in the fuel tank and cause problems. In accordance with embodiments of the present disclosure, to prevent water from entering the fuel tanks, the fuel inerting systems of the present disclosure can repressurize the fuel tanks with dry inert gas that is generated as described above and below. The repressurization can be accomplished by using a flow control valve to control the flow of inert gas into the fuel tank such that a positive pressure is constantly maintained in the fuel tank. The positive pressure within the fuel tank can prevent air from entering the fuel tank from outside during descent and therefore prevent water in the air outside the fuel tank from entering the fuel tank.

Figure 2:
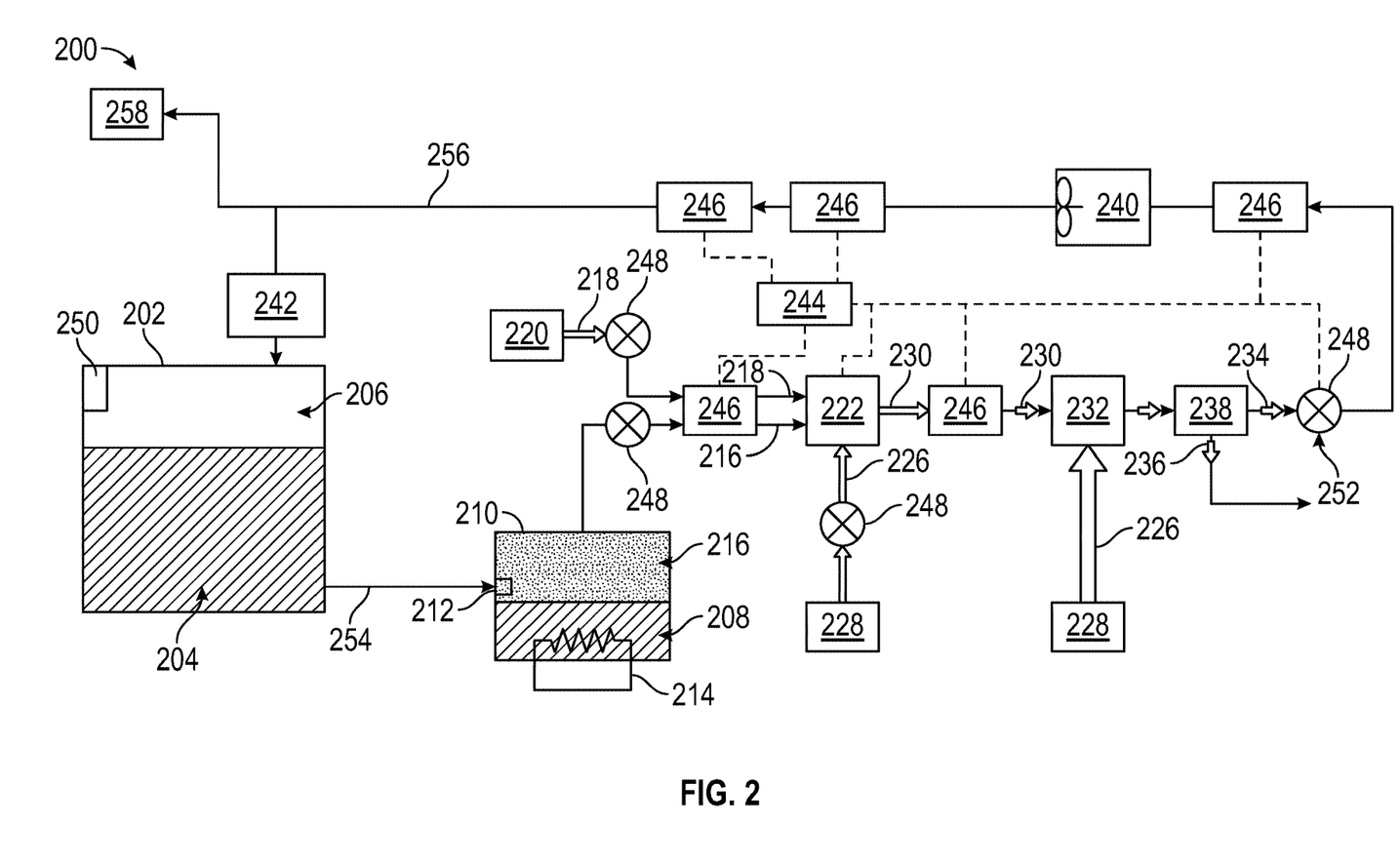
FIG. 2 is a schematic illustration of an example embodiment of a fuel tank inerting system.

FIG. 2 is a schematic illustration of a flammability reduction or inerting system 200 utilizing a catalytic reaction between first and second reactants to produce inert gas in accordance with an embodiment of the present disclosure. The inerting system 200, as shown, includes a fuel tank 202 having fuel 204 therein. As the fuel 204 is consumed during operation of one or more engines, an ullage space 206 forms within the fuel tank 202. To reduce flammability risks associated with vaporized fuel that may form within the ullage space 206, an inert gas can be generated and fed into the ullage space 206.

The inerting system 200 utilizes the catalytic reactor 222 to catalyze a chemical reaction between oxygen (second reactant 218) and fuel (first reactant 216) to produce carbon dioxide for the inert gas (inert gas 234) and water (byproduct 236). The source of the second reactant 218 (e.g., oxygen) used in the reaction can come from any source on the aircraft that is at a pressure greater than ambient, including but not limited to bleed air from an engine, cabin air, high pressure air extracted or bled from an engine, etc. (i.e., any second reactant source 220 can take any number of configurations and/or arrangements). Even non-air oxygen sources can be used, and "air" is used herein as a short-hand term for any oxygen-containing gas. As described in greater detail below, in some embodiments fuel can be introduced to a catalytic reactor in vapor or liquid form. To provide fuel in vapor form, an inerting fuel 208 can be extracted from the fuel tank 202 and into an evaporator container 210. The inerting fuel 208 within the evaporator container 210 can be heated using the electric heater 214.

With continued reference to FIG. 2, the first and second reactants are introduced to the catalytic reactor 222, catalyzing a chemical reaction that transforms the reactants into the inert gas 234 and the byproduct 236 (e.g., water vapor). It is noted that any inert gas species that are present in the reactants (for example, nitrogen from the air) will not react and will thus pass through the catalytic reactor 222 unchanged. In some embodiments, the catalytic reactor 222 is in a form factor that acts as a heat exchanger. For example, one non-limiting configuration may be a plate fin heat exchanger wherein the hot side of the heat exchanger would be coated with the catalyst material. Those of skill in the art will appreciate that various types and/or configurations of heat exchangers may be employed without departing from the scope of the present disclosure. The cold side of the catalyst heat exchanger can be fed with the cooling air 226 from the cool air source 228 (e.g., ram air or some other source of cold air). The air through the cold side of the catalyst heat exchanger can be controlled such that the reactor temperature is hot enough to sustain the chemical reaction desired within the catalytic reactor 222, but cool enough to remove the heat generated by the exothermic reaction, thus maintaining aircraft safety and materials from exceeding maximum temperature limits.

The catalytic reactor 222 can be temperature controlled to ensure a desired chemical reaction efficiency such that an inert gas can be efficiently produced by the inerting system 200 from the reactants. Accordingly, cooling air 226 can be provided to extract heat from the catalytic reactor 222 to achieve a desired thermal condition for the chemical reaction within the catalytic reactor 222. The cooling air 226 can be sourced from a cool air source 228. A catalyzed mixture 230 leaves the catalytic reactor 222 and is passed through a heat exchanger 232. The heat exchanger 232 operates as a condenser on the catalyzed mixture 230 to separate out an inert gas 234 and a byproduct 236 (e.g., water). A cooling air is supplied into the heat exchanger 232 to achieve the condensing functionality. In some embodiments, as shown, a cooling air 226 can be sourced from the same cool air source 228 as that provided to the catalytic reactor 222, although in other embodiments the cool air sources for the two components may be different. The byproduct 236 may be water vapor, and thus in the present configuration shown in FIG. 2, an optional water separator 238 is provided downstream of the heat exchanger 232 to extract the water from the catalyzed mixture 230, thus leaving only the inert gas 234 to be provided to the ullage space 206 of the fuel tank 202.

A flow control valve 248 located downstream of the heat exchanger 232 and optional water separator 238 can meter the flow of the inert gas 234 to a desired flow rate. An optional boost fan 240 can be used to boost the gas stream pressure of the inert gas 234 to overcome a pressure drop associated with ducting between the outlet of the heat exchanger 232 and the discharge of the inert gas 234 into the fuel tank 202. The flame arrestor 242 at an inlet to the fuel tank 202 is arranged to prevent any potential flames from propagating into the fuel tank 202.

Typically, independent of any aircraft flammability reduction system(s), aircraft fuel tanks (e.g., fuel tank 202) need to be vented to ambient pressure. Thus, as shown in FIG. 2, the fuel tank 202 includes a vent 250. At altitude, pressure inside the fuel tank 202 is very low and is roughly equal to ambient pressure. During descent, however, the pressure inside the fuel tank 202 needs to rise to equal ambient pressure at sea level (or whatever altitude the aircraft is landing at). This requires gas entering the fuel tank 202 from outside to equalize with the pressure in the tank. When air from outside enters the fuel tank 202, water vapor can be carried by the ambient air into the fuel tank 202. To prevent water/water vapor from entering the fuel tank 202, the inerting system 200 can repressurize the fuel tank 202 with the inert gas 234 generated by the inerting system 200. This is accomplished by using the valves 248. For example, one of the valves 248 may be a flow control valve 252 that is arranged fluidly downstream from the catalytic reactor 222. The flow control valve 252 can be used to control the flow of inert gas 234 into the fuel tank 202 such that a slightly positive pressure is always maintained in the fuel tank 202. Such positive pressure can prevent ambient air from entering the fuel tank 202 from outside during descent and therefore prevent water from entering the fuel tank 202.

A controller 244 can be operably connected to the various components of the inerting system 200, including, but not limited to, the valves 248 and the sensors 246. The controller 244 can be configured to receive input from the sensors 246 to control the valves 248 and thus maintain appropriate levels of inert gas 234 within the ullage space 206. Further, the controller 244 can be arranged to ensure an appropriate amount of pressure within the fuel tank 202 such that, during a descent of an aircraft, ambient air does not enter the ullage space 206 of the fuel tank 202.

In some embodiments, the inerting system 200 can supply inert gas to multiple fuel tanks on an aircraft. As shown in the embodiment of FIG. 2, an inerting supply line 254 fluidly connects the fuel tank 202 to the evaporator container 210. After the inert gas 234 is generated, the inert gas 234 will flow through a fuel tank supply line 256 to supply the inert gas 234 to the fuel tank 202 and, optionally, additional fuel tanks 258.

Figure 3:
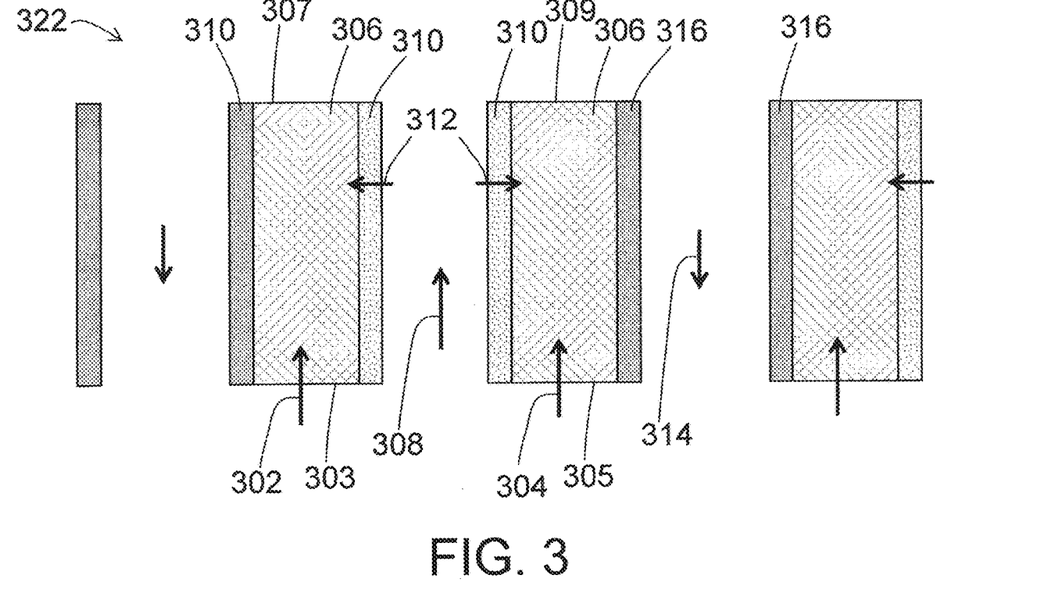
FIG. 3 is a schematic illustration of an example embodiment of a catalytic reactor of a fuel tank inerting system.

With reference now to FIG. 3, a portion of a catalytic reactor 322 is shown with greater details. The components and flow paths in FIG. 3 are arranged in a planar configuration shown in a cross-sectional view such as a top or side view. As shown in FIG. 3, first flow paths 302 and 304 introduce a first reactant to a catalyst 306 at inlets 303 and 305, and discharge inert gas at outlets 307 and 309, respectively. The catalyst 306 is disposed in an arrangement so as to be permeable to the flow of the first reactant. For example, the catalyst can be disposed as a powder, pellets, a foam, a coated honeycomb, or a coating on a wall surface adjacent to an open flow path space. Examples of catalysts include noble metals (e.g. Pt, Pd, Ru, Au, Ag, Rh and combinations thereof), either self-supporting or on a support such as alumina. Transition metal oxides such as manganese oxide can also be used as a catalyst. Catalyst composition variations can be provided with numerous variations on catalyst metal and dopants. In some embodiments, an upstream catalyst bed or reactor section can include a lower activity transition metal oxide catalyst such as manganese oxide and a downstream bed or section can include a higher activity noble metal catalyst such as a platinum or palladium catalyst.

As further shown in FIG. 3, a second reactant is delivered to a second flow path 308. The second flow path 308 is separated from the first flow paths 302/304 by a barrier 310 that is permeable to the second reactant, and the second reactant is shown transporting across the barrier along flow paths 312. The second flow path can include an outlet similar to the first flow path outlets 307/309, or can be dead-ended so that all of the reactant on the flow path is directed along flow paths 312. In some embodiments, the second flow path can be dead-ended (i.e., devoid of outlets except for across the barrier 310) or can include an outlet with controllable flow (e.g., a control valve downstream of the outlet) as a control feature to control the amount of reactant that enters the reactive first flow paths 302/304 along flow paths 312.

In some embodiments, the barrier can be in the form of a gas transport membrane. Gas transport membranes can rely on one or more physical phenomena for selectivity in transportation of gases across the membrane. In some embodiments, gas transport membranes can rely on porosity with molecular size-selective pathways to provide transport of molecules across the membrane. Examples of such membranes include a porous polymer matrix (e.g., formed from PEEK, or a polyimide or other high temperature polymer such as polybenzimidazole tolerant of the reaction temperatures) or a porous metal or porous ceramic (e.g., zeolite) or other oxide or a carbon based porous membrane or a composite membrane (for example nanocomposite polymer/carbon or polymer/silica) tailored to provide adequate transport performance and durability.

So-called reverse selective membranes rely on phenomena including the solubility of the gas molecules in the membrane material to provide transport through the membrane for molecules having solubility in the membrane. Examples of such membranes include organic polymer membranes that provide solubility for organic fuel vapor molecules to promote transport across the membrane. Solubility and pore size factors can be used to promote selectivity for types of molecules, for example to inhibit transport of first reactant across the membrane to the second flow path, or to prevent transport of contaminants (e.g., sulfur contaminants in fuel) across the membrane. Composite materials comprising organic and inorganic materials can also be used. The membrane can include any of the above materials, alone or in combination with each other or other selective materials. Combinations of different materials can be integrated into a single membrane structure (e.g., in layers, or zones in the x-y plane of a membrane structure), or can be disposed in series or in parallel as separate membrane structures or modules.

With continued reference to FIG. 3, a third flow path 314 is shown with a flowing fluid coolant. Any fluid coolant can be used, such as air (e.g., ram air) or a heat transfer fluid in a loop communication with a heat sink (not shown). The third flow path is shown in FIG. 3 with a fluid-impermeable barrier 316 between the third flow path and the first flow path. The barrier 316 can be made from any thermally conductive material such as a thermally conductive metal. In some embodiments, the third flow path can be controllably dead-ended or flow-limited (e.g., in response to cooling demand) to control the amount of coolant that flows along the third flow path 314. At this point, it should be noted that the configuration pattern of components shown in FIG. 3 can be extended with additional components and flow paths. For example, FIG. 3 shows additional unnumbered catalyst and first flow path to the right-hand side of FIG. 3 and an additional unnumbered third flow path to the left-hand side of FIG. 3. In embodiments with such multiple flow paths, any one or a plurality of the second or third flow paths can be dea-ended or have an open or controllable outlet as described above.

Figure 4:
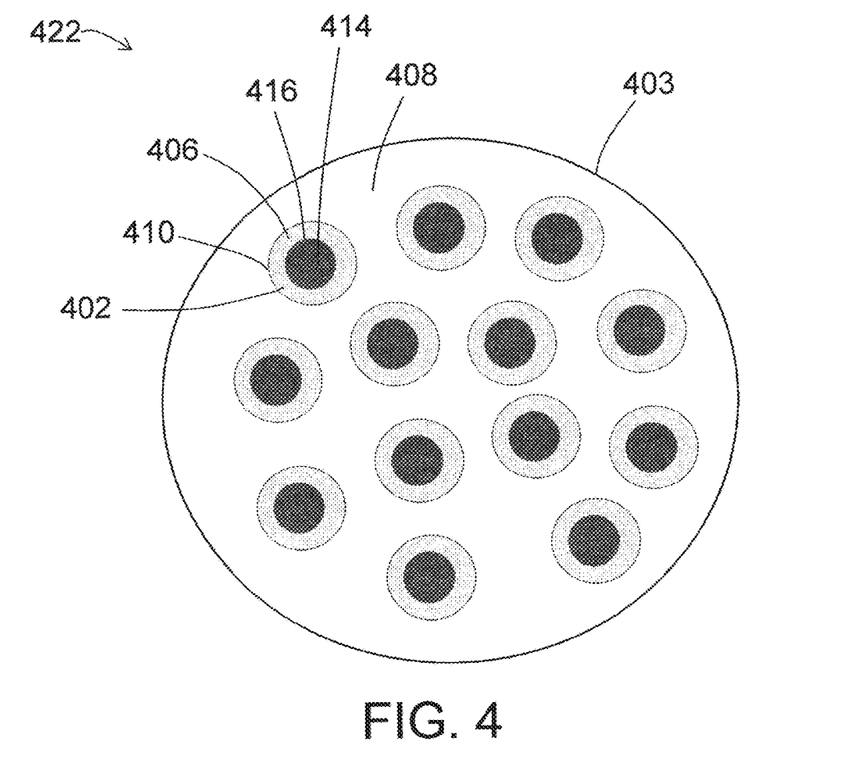
FIG. 4 is a schematic illustration of another example embodiment of a catalytic reactor of a fuel tank inerting system.

In some embodiments, a reactor can be configured with a plurality of tubular conduits as shown in the cross-sectional end view of reactor 422 in FIG. 4. As shown in FIG. 4, a plurality of conduits 416 (for convenience, only one of the conduits in FIG. 4 is labeled and discussed) are disposed inside a reactor housing 403, with a third flow path 414 with flowing fluid coolant on the inside of the conduit. A catalyst 406 is disposed on the exterior of the conduit, providing a first reactant flow path 402, which is separated from a second reactant flow path 408 in the space in the reactor housing 403 external to the conduits by a barrier 410 that is permeable to the second reactant. As with FIG. 3, the second flow path 408 can be open or dead-ended at an axial terminus or can have a flow controlled axially-terminal outlet, and any one or combination of the third flow paths 414 can be controllably dead-ended or flow-limited in response to cooling demand.

In some embodiments, a technical effect can be provided of managing or controlling reactor temperature. This can be accomplished, for example, by controlling the respective flows of one or more of the first and second reactants and the fluid coolant. In some embodiments, controller 244 (FIG. 2) can be configured to control one or more of these flow rates to maintain a temperature in the catalytic reactor (e.g., along the first flow path) or at an outlet of the reactor (e.g., outlet of the first flow path). For example, temperature can be reduced by increasing the flow of coolant, or decreasing the flow of fuel and/or air-$O_2$. In some embodiments, the flow rates can be controlled to maintain a temperature at less than or equal to 325° C. In some embodiments, the flow rates can be controlled to maintain a temperature at less than or equal to 300° C. In some embodiments, the flow rates can be controlled to maintain a temperature at less than or equal to 275° C. In some embodiments, the flow rates can be controlled to maintain a temperature at less than or equal to 250° C.

The term "about", if used, is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fuel tank inerting system, comprising:
a fuel tank;
a catalytic reactor arranged to receive a first reactant from a first reactant source and to receive a second reactant from a second reactant source, and to react the first and second reactants to generate an inert gas; and
an inert gas flow path from the catalytic reactor to the fuel tank, wherein the catalytic reactor comprises:
a first flow path comprising a first inlet in operative fluid communication with the first reactant source, a first outlet in operative fluid communication with the inert gas flow path, and a reactive flow path including a catalyst between the first inlet and the first outlet;
a second flow path comprising a second inlet in operative fluid communication with the second reactant source, said second flow path in operative fluid communication with the first flow path through a first barrier between the first and second flow paths that is permeable to the second reactant; and
a third flow path comprising a third inlet in operative fluid communication with a fluid coolant, and a third outlet, said third flow path in operative thermal communication with the first flow path.

2. The fuel tank inerting system of claim 1, wherein the first reactant comprises air, and the second reactant comprises fuel.

3. The fuel tank inerting system of claim 2, comprising liquid fuel on the second flow path.

4. The fuel tank inerting system of claim 2, comprising vaporized fuel on the second flow path.

5. The fuel tank inerting system of claim 1, wherein the first reactant comprises vaporized fuel, and the second reactant comprises oxygen.

6. The fuel tank inerting system of claim 1, wherein the second flow path is devoid of outlets except through the first barrier.

7. The fuel tank inerting system of claim 1, wherein the catalytic reactor comprises a plurality of said first flow paths, or a plurality of said second flow paths, or a plurality of said third flow paths, or any combination thereof.

8. The fuel tank inerting system of claim 1, further comprising a heat source or a heat sink in operative thermal communication with either or both of the first reactant or the second reactant delivered to either or both of the first or second inlets.

9. The fuel tank inerting system of claim 1, wherein said first, second, and third flow paths are arranged in the catalytic reactor in a planar configuration.

10. The fuel tank inerting system of claim 1, wherein at least one of the first flow path, the second flow path, or the third flow path comprises an internal space of a tubular conduit disposed in the catalytic reactor.

11. The fuel tank inerting system of claim 10, wherein another of the first flow path, the second flow path, or the third flow path comprises a space in the catalytic reactor external to the tubular conduit.

12. The fuel tank inerting system of claim 10, wherein the third flow path comprises the internal space of the tubular conduit.

13. The fuel tank inerting system of claim 10, wherein the first flow path comprises the catalyst disposed in a fluid-permeable arrangement on an exterior surface of the tubular conduit.

14. The fuel tank inerting system of claim 10, wherein the third flow path comprises the internal space of the tubular conduit, the first flow path comprises the catalyst disposed in a fluid-permeable arrangement on an exterior surface of the tubular conduit, and the second flow path comprises a space in the catalytic reactor external to the tubular conduit.

15. The fuel tank inerting system of claim 1, further comprising a second barrier between the second flow path and the third flow path, said second barrier being thermally conductive and impermeable to fluids.

16. The fuel tank inerting system of claim 1, further comprising a controller configured to control at least one of a flow rate of the first reactant, a flow rate of the second reactant, or a flow rate of the fluid coolant.

17. The fuel tank inerting system of claim 16, wherein the controller is configured to control at least one of the first reactant flow rate, the second reactant flow rate, or the fluid coolant flow rate to maintain a temperature in the catalytic reactor or at an outlet of the catalytic reactor.

18. The fuel tank inerting system of claim 17, wherein the controller is configured to maintain the temperature at less than 300° C.

19. A method of operating the fuel tank inerting system of claim 1, comprising delivering the first and second reactants to the first and second inlets and delivering the fluid coolant to the third inlet, reacting the first and second reactants along the reactive flow path to produce inert gas, and delivering the inert gas through the inert gas flow path to the fuel tank.

20. The method of claim 19, further comprising controlling at least one of a flow rate of the first reactant, a flow rate of the second reactant, or a flow rate of the fluid coolant to maintain a temperature in the catalytic reactor or at an outlet of the catalytic reactor.

* * * * *